United States Patent Office 2,779,761
Patented Jan. 29, 1957

2,779,761
PROCESS FOR PREPARING AMINE POLYSULFIDES

Richard W. Kibler, Cuyahoga Falls, Ohio, assignor to The Firestone Tire & Rubber Company, Akron, Ohio, a corporation of Ohio No Drawing. Application April 28, 1952,
Serial No. 284,812

5 Claims. (Cl. 260—247.1)

This invention relates to an improved method of preparing the higher polysulfides of water soluble, saturated secondary amines.

Higher polysulfides of aliphatic and heterocyclic secondary amines have recently been prepared by a two-step process. The appropriate amine is first reacted with free sulfur or sulfur monochloride to produce an intermediate polysulfide, e. g., the disulfide, trisulfide or tetrasulfide. The intermediate sulfide is isolated and then reacted with free sulfur by heating a mixture of the intermediate sulfide and the calculated amount of sulfur to a temperature above the melting point of sulfur, usually about 120° to 130° C. The molten mixture is usually maintained at this temperature for several hours in order to insure completing the reaction. Then the mixture is cooled and allowed to stand for several days to allow the unreacted sulfur to precipitate. The oily product is dark colored because of decomposition occurring during the prolonged heating.

An object of the present invention is to provide a more efficient and convenient method of producing the higher polysulfides of water soluble, saturated secondary amines. Another object is to provide a one-step method of converting a water soluble, saturated secondary amine to a desired higher polysulfide. Another object is to provide a method of preparing light colored higher polysulfides substantially free from decomposition products. The above and further objects will be apparent in the following description of the invention.

The objects of the invention are realized by reacting the secondary amine in an alkaline aqueous medium with a solution of sulfur in sulfur monochloride. Water solutions of the water soluble amines are suitable for the initial reaction medium. The less soluble amines are reacted suspended in water, although it is sometimes desirable to add a chemically inert water miscible organic liquid to the suspension in order to cause a portion or all of the amine to dissolve in the mixed solvent reaction medium; suitable organic solvents include dioxane, a cyclic ether. The sulfur monochloride solution is usually prepared by heating a mixture of sulfur and sulfur monochloride to an elevated temperature, suitably just above the melting point of sulfur, in order to hasten the production of a homogeneous liquid or solution, and the latter is cooled to room temperature before use.

The reaction medium is initially somewhat alkaline because it contains the basic amine more or less in dissolved form. The reaction is carried out by gradually adding the sulfur-sulfur monochloride solution to the aqueous medium containing the amine. As the sulfur monochloride reacts with the amine, hydrochloric acid is formed, and it is desirable to neutralize this acid substantially as it is formed, in order to keep the reaction medium alkaline. The preferred method involves gradually adding a caustic solution, such as aqueous sodium hydroxide or aqueous potassium hydroxide, to the reaction medium while simultaneously adding the sulfur-sulfur monchloride solution. It has been found desirable to maintain the pH of the reaction mixture in the range of 8.0 to 11.5 for production of maximum yields of the pure desired polysulfide.

The following examples are given to illustrate the invention.

EXAMPLE 1
*Preparation of hexathio-bis-dimethylamine*

Into a reaction vessel provided with a thermometer and a stirrer there is placed 118 grams of a 38% commercial aqueous solution of dimethylamine (corresponding to 45 grams or 1 mole of the anhydrous amine). A sulfur-sulfur monochloride solution, previously prepared by heating 32 grams (1 gram atom) of sulfur with 135 grams (1 mole) of sulfur monochloride, is placed in a dropping funnel connected with the reaction vessel. Another dropping funnel is provided with a solution of 90 grams (2.25 moles) of sodium hydroxide in 150 ml. of water. The vessel is cooled by means of an ice bath. The reaction is carried out by simultaneously adding the two reagents from the dropping funnels, dropwise, to the stirred dimethylamine solution. The rate of addition of the sulfur-sulfur monochloride solution is adjusted so that the temperature of the reaction mixture remains in the range of 15° to 30° C. The sodium hydroxide solution is added at a rate such as to maintain the reaction medium alkaline. The initial pH of the dimethylamine solution is found to be about 11.2, and the final pH after all reagents are added is in the range of 8.0 to 8.5, as determined by means of a glass electrode. The reaction mixture is stirred for two hours after the addition of reactants. The oil layer is then separated, filtered to remove free sulfur, washed with water and dried, as by heating 4 hours at 50° C. under a vacuum of 5 mm. of mercury. The product, hexathio-bis-dimethylamine, is obtained as 114 grams (82% of the theoretical yield from the dimethylamine employed) of a light tan fluid oil. By adding 100 grams of sodium hydroxide to the aqueous layer of the reaction mixture and refluxing the resulting solution for 6 hours in a closed system containing a gas absorbing water trap, unreacted dimethylamine is recovered to the extent of 3.6 grams. Thus the yield of the hexasulfide based upon dimethylamine reacted is 88%. The recovered amine may be recycled into a succeeding batch preparation of the hexasulfide.

The hexathio-bis-dimethylamine so produced displays the following analytical data:

|  | Found percent | Calculated percent |
|---|---|---|
| Sulfur | 68 to 70 | 68.6 |
| Nitrogen | 9.3 to 9.6 | 10.0 |

The product possesses the physical properties, $d_4^{20}$ 1.3455 and $n_D^{20}$ 1.6798. When the product is dissolved in a solvent such as benzene, ether, n-hexane, acetone, chloroform or ethylene dichloride, a small quantity of crystalline sulfur is precipitated, and the purified oil recovered from the solvent, by evaporation of the latter, analyzes about 67.5 to 69.5% sulfur.

Substantially similar results are obtained at reaction temperatures as low as 0° C.; by varying the sodium hydroxide between 2 and 2.5 moles per mole of dimethylamine; or by varying the water in the sodium hydroxide solution between 100 and 200 ml. per mole of dimethylamine.

EXAMPLE 2
*Preparation of polythio-bis-morpholine*

Proceeding as in Example 1, a solution of 87 grams (1 mole) of morpholine in 100 ml. of water is stirred at 15° to 30° C. during the simultaneous dropwise additions of a solution of 90 grams of sodium hydroxide in 150 ml. of water and a solution of 32 grams of sulfur in 135 grams (1 mole) of sulfur monochloride. The mixture is stirred for 2 hours after addition of the reactants. A viscous, taffy-like product is separated from the aqueous layer of the reaction mixture and then is extracted with ether. The ether extract is filtered to remove a small amount of free sulfur, and the ether is evaporated from the filtrate. The residue is dried by heating for 3 hours at 60° C. under a vacuum of 5 mm. The resulting product, 82 grams of a clear, viscous, straw-colored oil, analyzes as follows:

|  | Percent S | Percent N |
| --- | --- | --- |
| Found | 50.8 | 8.06 |
| Theory for hexathio-bis-morpholine | 52.6 | 7.72 |
| Theory for pentathio-bis-morpholine | 48.2 | 8.45 |

EXAMPLE 3

Proceeding as in Example 1, a solution of 85 grams (1 mole) of piperidine in 100 ml. of water is stirred at 15° to 30° C. during the simultaneous dropwise additions of a solution of 90 grams of sodium hydroxide in 150 ml. of water and a solution of 32 grams of sulfur in 135 grams of sulfur monochloride. The mixture is stirred for 2 hours after addition of the reactants. A very viscous oily product is separated from the aqueous layer of the reaction mixture and then is extracted with ether. The ether extract is filtered and the ether is evaporated from the filtrate. The residue is dried by heating for 3 hours at 65° C. under a vacuum of 5 mm. The resulting product, 92 grams of a viscous oil, anaylzes as follows:

|  | Percent S | Percent N |
| --- | --- | --- |
| Found | 51.0 | 8.06 |
| Theory for hexathio-bis-piperidine | 53.2 | 7.80 |
| Theory for pentathio-bis-piperidine | 48.6 | 8.55 |

The reaction temperature is inherently maintained substantially below the reaction temperatures utilized by the prior art method of heating a lower sulfide with sulfur at or above the melting point of the latter. The present method is carried out at temperatures in the range of 0° to 100° C., the liquid range of water. In the case of the more volatile amines, the reaction temperature is preferably maintained below the boiling point of the amine.

Slightly more or less than one gram-atom of sulfur may be dissolved in one mole of sulfur chloride to provide the sulfur containing reagent. For the production of hexasulfides or higher polysulfides such as heptasulfides it is usually desirable to employ at least one gram-atom of sulfur dissolved in one mole of sulfur monochloride for each mole of starting amine; it is sometimes desirable to dissolve slightly more than one gram-atom of sulfur in a mole of sulfur monochloride; and it is also often advantageous to use more than one mole of the sulfur monochloride solution (containing one gram-atom of sulfur) per mole of amine. Sulfur dichloride may be used instead of sulfur monochloride, but in this case correspondingly more free sulfur should be dissolved therein for equivalent production of hexa- and higher sulfides.

I claim:

1. Method of producing polythio-bis-secondary amines containing more than four sulfur atoms per molecule by a one-step reaction, comprising simultaneously adding a caustic solution and a solution of at least one gram-atom of free sulfur in one mole of sulfur monochloride to an alkaline aqueous reaction medium containing one mole at a secondary amine from the group consisting of water soluble, saturated aliphatic and heterocyclic secondary amines, the secondary amine containing from two to five inclusive carbon atoms per molecule, maintaining the pH of the reaction medium in the range of 8.0 to 11.5 by controlling the rate of adding the caustic solution.

2. Method of making hexathio-bis-dimethyl amine comprising simultaneously adding a caustic solution and a solution of one gram atom of free sulfur in one mole of sulfur monochloride to an alkaline aqueous solution of substantially one mole of dimethyl amine, maintaining the pH of the reaction solution in the range of 8.0 to 11.5 by controlling the rate of adding the caustic solution.

3. Method of making hexathio-bis-dimethyl amine comprising simultaneously adding a caustic solution and a solution of two gram atoms of free sulfur in one mole of sulfur dichloride to an alkaline aqueous solution of substantially one mole of dimethyl amine, maintaining the pH of the reaction solution in the range of 8.0 to 11.5 by controlling the rate of adding the caustic solution.

4. Method of making polythio-bis-piperidine containing more than four sulfur atoms per molecule by a one-step reaction, comprising simultaneously adding a caustic solution and a solution of one gram-atom of free sulfur in one mole of sulfur monochloride to an alkaline aqueous solution of substantially one mole of piperidine, maintaining the pH of the reaction solution in the range of 8.0 to 11.5 by controlling the rate of adding the caustic solution.

5. Method of making polythio-bis-morpholine containing more than four sulfur atoms per molecule by a one-step reaction, comprising simultaneously adding a caustic solution and a solution of one gram-atom of free sulfur in one mole of sulfur monochloride to an alkaline aqueous solution of substantially one mole of morpholine, maintaining the pH of the reaction solution in the range of 8.0 to 11.5 by controlling the rate of adding the caustic solution.

References Cited in the file of this patent

UNITED STATES PATENTS

| 1,798,588 | Cambron | Mar. 31, 1931 |
| 1,842,711 | Birchall et al. | June 26, 1932 |
| 2,259,164 | Jones | Oct. 24, 1941 |
| 2,343,524 | Blake | Mar. 7, 1944 |
| 2,351,657 | Bayes | June 20, 1944 |
| 2,356,171 | Mathes | Aug. 22, 1944 |
| 2,417,954 | Sloan | Mar. 25, 1947 |

UNITED STATES PATENT OFFICE

CERTIFICATE OF CORRECTION

Patent No. 2,779,761 January 29, 1957

Richard W. Kibler

It is hereby certified that error appears in the printed specification of the above numbered patent requiring correction and that the said Letters Patent should read as corrected below.

Column 4, line 13, for "at" read -- of --.

Signed and sealed this 2nd day of July 1957.

(SEAL)

Attest:
KARL H. AXLINE
Attesting Officer

ROBERT C. WATSON
Commissioner of Patents